United States Patent
DeLuca (10) Patent No.: US 10,200,456 B2
(45) Date of Patent: Feb. 5, 2019

(54) MEDIA SUGGESTIONS BASED ON PRESENCE

(71) Applicant: International Business Machines Corporation, Armonk, NY (US)

(72) Inventor: Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 565 days.

(21) Appl. No.: 14/729,492

(22) Filed: Jun. 3, 2015

(65) Prior Publication Data

US 2016/0357773 A1 Dec. 8, 2016

(51) Int. Cl.
G06F 3/048 (2013.01)
H04L 29/08 (2006.01)
G06F 17/30 (2006.01)
G06Q 30/06 (2012.01)
G06Q 50/00 (2012.01)

(52) U.S. Cl.
CPC ........ *H04L 67/10* (2013.01); *G06F 17/30867* (2013.01); *G06Q 30/0631* (2013.01); *G06Q 50/01* (2013.01); *H04L 67/2833* (2013.01); *H04L 67/306* (2013.01)

(58) Field of Classification Search
CPC ....... G06F 3/0482; H04L 67/10; G06Q 50/01; G06Q 30/0631
See application file for complete search history.

(56) References Cited

U.S. PATENT DOCUMENTS

| | | |
|---|---|---|
| 4,996,642 A | 2/1991 | Hey |
| 7,693,535 B2 | 4/2010 | Dunko |
| 7,805,129 B1 | 9/2010 | Issa et al. |
| 8,583,671 B2 | 11/2013 | Martin et al. |
| 8,682,897 B2 | 3/2014 | Nix et al. |
| 8,949,871 B2 | 2/2015 | Chai et al. |
| 9,094,722 B2 | 7/2015 | Phillips et al. |
| 2006/0184558 A1* | 8/2006 | Martin .............. G06F 17/30867 |
| 2009/0006368 A1 | 1/2009 | Mei et al. |
| 2009/0210415 A1* | 8/2009 | Martin .............. G06F 17/30038 |
| 2010/0318919 A1 | 12/2010 | Murphy et al. |
| 2011/0208617 A1 | 8/2011 | Weiland |
| 2014/0067828 A1 | 3/2014 | Archibong et al. |
| 2014/0297001 A1* | 10/2014 | Silverman .............. G05B 15/02 700/19 |

(Continued)

OTHER PUBLICATIONS

Bassoli et al.; "tunA: Local Music Sharing with Handheld Wi-Fi Devices"; The Fifth Wireless World Conference, University of Surrey, UK, Jul. 15-16, 2004; pp. 1-23.

(Continued)

*Primary Examiner* — Pei Yong Weng
(74) *Attorney, Agent, or Firm* — L. Jeffrey Kelly; Douglas M. Crockatt (57) ABSTRACT

Embodiments of the present invention provide systems and methods for suggesting media content to a group of users. The method includes identifying more than one device at a location and pairing the devices. The method further includes receiving at least one media content preference from the users of the devices, and performing a search of the media content, based on the received preferences. A suggestion from the searched media content is provided to the users of the devices.

20 Claims, 4 Drawing Sheets

(56) References Cited

U.S. PATENT DOCUMENTS

2014/0365313 A1 12/2014 Reese et al.

OTHER PUBLICATIONS

Eustice et al.; "The Smart Party: A Personalized Location-aware Multimedia Experience"; Consumer Communications and Networking Conference, Jan. 2008; pp. 1-5.
Willerer, Tom; "Connecting with your friends on Netflix"; Netflix US & Canada Blog; Jan. 11, 2011; pp. 1-26; <http://blog.netflix.com/2011/01/connecting-with-your-friends-on-netflix.html>.

* cited by examiner

MEDIA SUGGESTIONS BASED ON PRESENCE

BACKGROUND OF THE INVENTION

The present invention relates generally to the field of electronic devices, and more particularly to suggesting media to a group of people based on user presence and user preferences.

Electronic devices, such as tablets, mobile phones, and smart watches, are widely used to communicate information, such as audio and video content. Additionally, social networking websites allow users to share audio and video content with other users.

SUMMARY

According to one embodiment of the present invention, a method for suggesting media content is provided, the method comprising: at a location, identifying, by one or more processors, at least two devices; receiving, by one or more processors, a user identification of an owner of the at least two devices; receiving, by one or more processors, at least one media content preference associated with each owner of the at least two devices; identifying, by one or more processors, a list of media content preferences from the at least one media content preference associated with each owner of the at least two devices; and receiving, by one or more processors, a user selection based on the identified list of media content preferences.

According to another embodiment of the present invention, a computer program product for suggesting media content is provided, the computer program product comprising: a computer readable storage medium and program instructions stored on the computer readable storage medium, the program instructions comprising: program instructions to, at a location, identify at least two devices; program instructions to receive a user identification of an owner of the at least two devices; program instructions to receive at least one media content preference associated with each owner of the at least two devices; program instructions to identify a list of media content preferences from the at least one media content preference associated with each owner of the at least two devices; and program instructions to receive a user selection based on the identified list of media content preferences.

According to another embodiment of the present invention, a computer system for suggesting media content is provided, the computer system comprising: one or more computer processors; one or more computer readable storage media; program instructions stored on the one or more computer readable storage media for execution by at least one of the one or more processors, the program instructions comprising: program instructions to, at a location, identify at least two devices; program instructions to receive a user identification of an owner of the at least two devices; program instructions to receive at least one media content preference associated with each owner of the at least two devices; program instructions to identify a list of media content preferences from the at least one media content preference associated with each owner of the at least two devices; and program instructions to receive a user selection based on the identified list of media content preferences.

DETAILED DESCRIPTION

Embodiments of the present invention provide methods and systems for suggesting media content to multiple users within the same location, based partially on the preferences of the multiple users present at the location.

Figure 1:
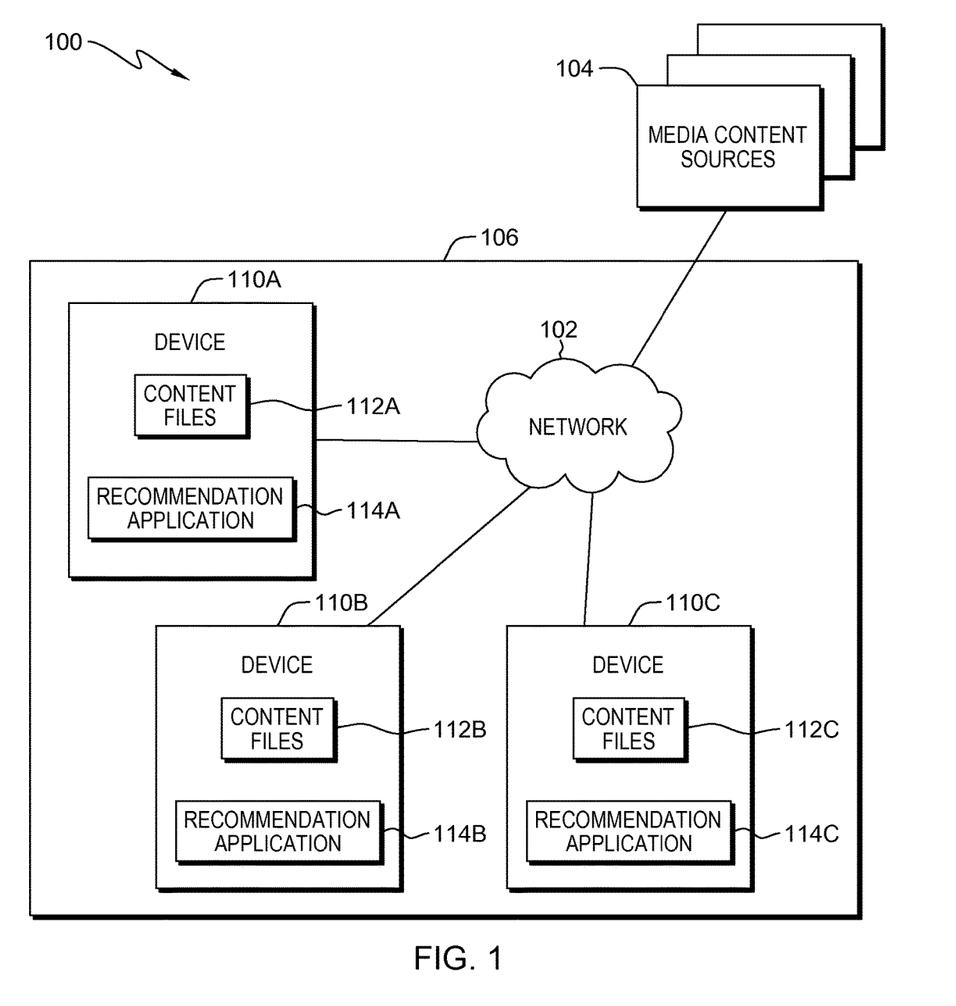
FIG. 1 depicts a functional block diagram of a distributed processing environment, in accordance with an embodiment of the present invention.

The present invention will now be described in detail with reference to the Figures. FIG. 1 depicts a functional block diagram illustrating a distributed processing environment, generally designated 100, in accordance with an embodiment of the present invention. Modifications to distributed processing environment 100 may be made by those skilled in the art without departing from the scope of the invention as recited by the claims. In an exemplary embodiment, distributed processing environment 100 includes devices 110A, 110B, and 110C and media content sources 104, all interconnected via network 102. Distributed processing environment 100 may include additional devices, servers, or other components not shown.

Network 102 can be, for example, a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support communications between devices 110A-C in accordance with an embodiment of the present invention. Network 102 may include wired, wireless, or fiber optic connections.

Media content sources 104 provide various forms of media content items (e.g., audio content, video content, text content, etc.) to a recipient. Media content sources 104 may be an entertainment content (e.g., movies or music) provider, a real-time dynamic data provider (e.g., weather information), or a service provider (e.g., a cable or satellite service provider), among other media content providers. Media content sources 104 may also be a provider of any interactive media application. For example, media content sources 104 may be a TV media player application, an electronic program guide, and/or navigation applications, among other applications. Examples of media content sources 104 may include: Netflix®, Hulu®, DVR services, cable television services, Amazon® services, YouTube®, iTunes®, and other streaming services. In some embodiments, one or more of media content sources 104 may be a server computer, management server, a web server, or any other electronic devices capable of receiving and sending media content data.

In this exemplary embodiment, devices 110A-C are at location 106. Location 106 is an area where each of devices 110A-C may communicate, for example, over a personal area network (PAN). A PAN may be a computer network with a small geographic scope. Computer networks with a small geographic scope range from Near Field Communication (NFC) to Local Area Networks (LANs). A computer network with a small geographic scope typically does not have a connection to the Internet or other remote networks. Personal area network (PAN) can be used for communication among mobile devices themselves (intrapersonal communication), or for connecting to a higher level network (e.g., the Internet). A wireless personal area network (WPAN) is a PAN carried over wireless network technologies such as Bluetooth® or peer-to-peer communications over a wireless LAN (Bluetooth is a registered trademark of Bluetooth SIG, Inc.). For purposes of this exemplary embodiment, the presence of a user at a location is defined as the presence of the user within an audible and/or visual distance to device 110A (or the device providing the media content) such that the user can consume (i.e., watch, listen to, etc.) the media content. Location 106 may be, for example, a vehicle or a room.

Devices 110A-C include content files 112A-C, respectively, and recommendation application 114A-C, respectively. In various embodiments of the present invention, devices 110A-C can be a laptop computer, a tablet computer, a netbook computer, a personal computer (PC), a desktop computer, a personal digital assistant (PDA), a smart phone, a wearable device, or any programmable electronic device capable of sending and receiving data and communicating with other devices over network 102. In embodiments of the present invention, devices 110A-C each have the necessary hardware to allow for communication over any type of personal area network (PAN) which is used for communication between them (e.g., a Bluetooth radio). In this exemplary embodiment, device 110A is the host device (i.e., the device displaying the media content). In other embodiments, one or more of devices 110A-C (or other devices not depicted) may act as the host device. Devices 110A-C and media content sources 104 may each include components as depicted in further detail with respect to FIG. 4.

Content files 112A-C include information reflective of media content preferences (e.g., a preferred genre of movies) and media content consumption (e.g., which movies have been viewed) of each user of devices 110A-C. Content files 112A-C may be updated using information received by devices 110A-C from media content sources 104 and/or may be updated manually by a user of devices 110A-C.

Recommendation application 114A-C is a software program capable of determining the consumed and/or preferred media content of a group of users within the same location and recommending media content to the group of users. Recommendation application 114A-C can access and search media content sources 104 and can update content files 112A-C. Recommendation application 114A-C are each different instances of the same application on different devices (i.e., devices 110A-C). In some embodiments, recommendation application 114A-C may be integrated with content files 112A-C, respectively.

Figure 2:
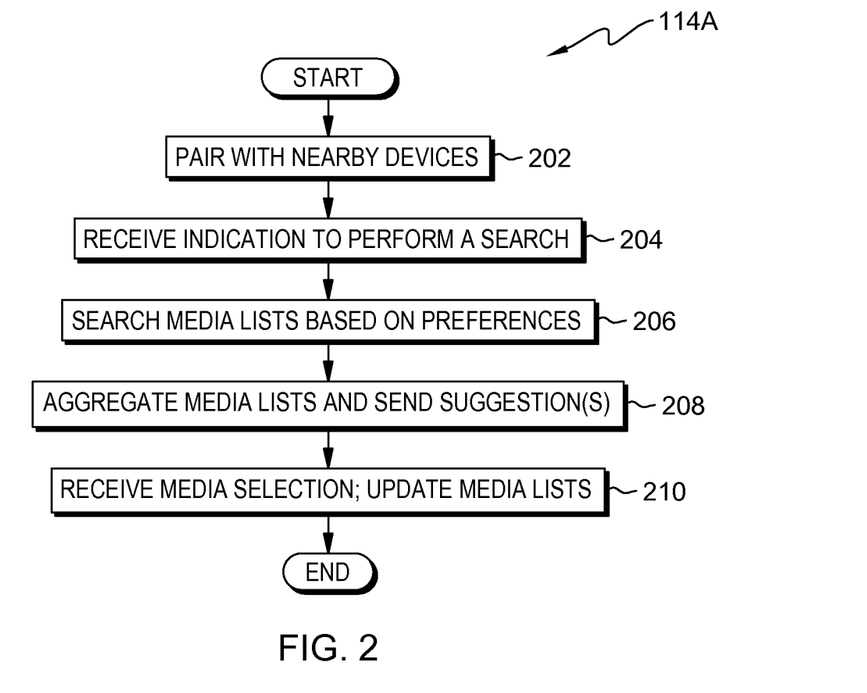
FIG. 2 depicts a flowchart illustrating operational steps of a recommendation application for recommending media content to a group of users within the same location, in accordance with an embodiment of the present invention.

FIG. 2 depicts a flowchart illustrating operational steps of recommendation application 114A for recommending media content to a group of users within the same location, in accordance with an embodiment of the present invention. For illustrative purposes, the following discussion is made with respect to recommendation application 114A on device 110A (i.e., the host device); it being understood that the operational steps of FIG. 2 may be performed by any instance of recommendation application 114A-C on devices 110A-C, or on other devices not pictured in FIG. 1.

In step 202, recommendation application 114A determines which users are present at a location. In this exemplary embodiment, recommendation application 114A determines which users are present at location 106, by automatically pairing device 110A (associated with a user) with other devices (each associated with a user) detected to be present at a location, using any of the device pairing technology described above (e.g., Bluetooth, GPS, location triangulation, etc.). In other embodiments, a user of device 110A may manually enter the information of other users present at the same location 106, in order to perform a search of the media information of each user.

In step 204, recommendation application 114A receives an indication to perform a search of the media content associated with each user. In this exemplary embodiment, recommendation application 114A receives a request for media content (e.g., movie, music, television show) from one or more present users. For example, a user present at location 106 may request a particular genre of music (e.g., country music) or may request a particular genre of movies (e.g., comedy movies). In some embodiments, recommendation application 114A gives more weight to the preferences of the user requesting the media content. For example, a user of device 110A, requesting a suggestion of a movie that all of the users at a location have not yet viewed, may be given more weight by recommendation application 114A when performing a media search, than the weight given to the preferences of the other users of the group. In other embodiments, recommendation application 114A may automatically begin to perform a pre-determined content search, in response to detecting one or more devices are present in the same location 106.

In step 206, recommendation application 114A searches the media lists of each user in the group, based on the received preferences. In this exemplary embodiment, each present user has a separate set of media content, which is maintained in content files 112A-C, media content sources 104, and/or any other location that is capable of maintaining a list of media content for a user. For example, if a request for a media content search is received consisting of movies that no user from the group of present users has viewed, then media sources, such as a 'watched list' maintained on Netflix® or Amazon®, may be searched by recommendation application 114A.

In step 208, recommendation application 114A aggregates the media lists and sends a suggestion(s) to the group of users. In this exemplary embodiment, recommendation application 114A compiles the media lists from media content sources 104 and content files 112A-C for each present user, and analyzes the media lists to determine one or more suggestions for the group of present users, based on the received search preferences. For example, based on a user request for a comedy movie which no one in the room has viewed, recommendation application 114A may aggregate the Netflix® 'watched list' for each present user and compare each individual list to a group list in order to determine a comedy movie that no user has viewed, and send the suggested movie to the devices of the group of present users.

In step 210, recommendation application 114A receives a media selection from the users and updates the media lists of each present user. In this exemplary embodiment, recommendation application 114A receives the media selection(s) which the present users chose to consume, and then updates the media lists of each user. For example, the Netflix 'watched list' for each user may be automatically updated, adding a movie selection the users decide to view. In other embodiments, the present users may manually update a local or remote media list, based on the group media selection. In some embodiments of the present invention, recommendation application 114A receives a particular media content (e.g., a video) and indicates to the requesting user which users from the group of present users have not consumed the particular media content.

Figure 3:
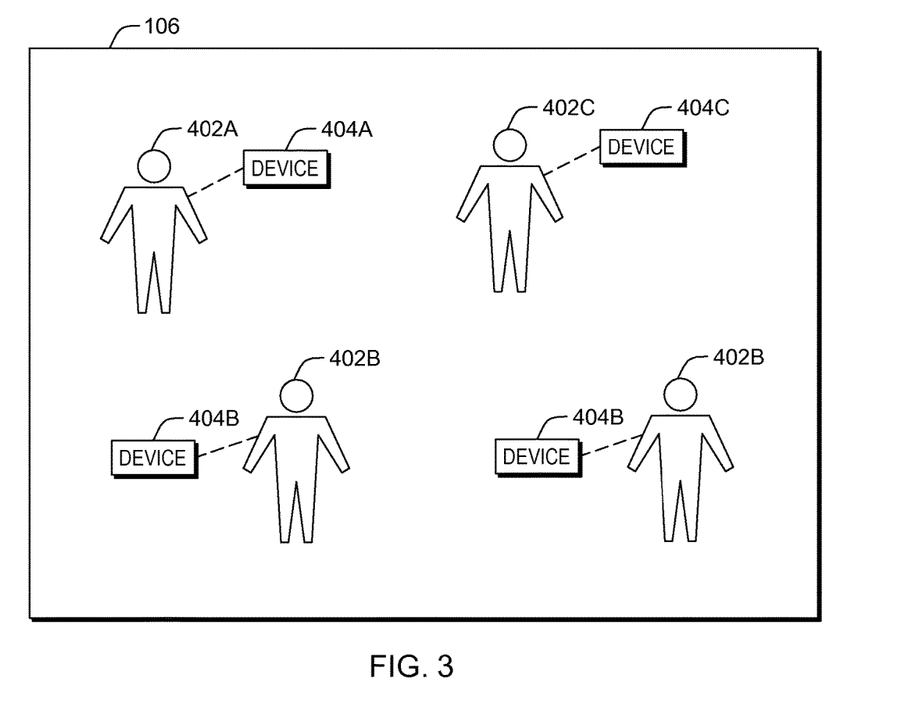
FIG. 3 depicts an example of a location with a group of users for implementing a recommendation application, in accordance with an embodiment of the present invention.

FIG. 3 depicts an example of location 106 with a group of users 402A-D for implementing recommendation application 114A, in accordance with an embodiment of the present invention.

In this exemplary embodiment, location 106 is a vehicle, and each of users 402A-D are located inside the vehicle. Each of users 402A-D is associated with a device 404A-D, respectively. Each device 404A-D contains content files and recommendation application (not pictured in FIG. 3). In an example, users 402A-D are in location 106 (a vehicle) and device 404A associated with user 402A automatically detects devices 404B-D of users 402B-D, respectively, using Bluetooth® technology (i.e., step 202 of FIG. 2). User 402A requests a search of music that has never been consumed (i.e., listened to) by any of users 402A-D (i.e., step 204 of FIG. 2). The recommendation application performs a search of the music consumed by each of users 402A-D by searching locally on devices 404A-D and remotely on media content sources 104 (i.e., step 206 of FIG. 2). Recommendation application aggregates the lists of searched music of each of users 402A-D and determines one or more suggestions of music which none of users 402A-D have consumed (i.e., step 208 of FIG. 2). The music lists of each user 402A-D are updated with the consumed music (e.g., recently played list on iTunes®), after recommendation application receives the selection(s) from users 402A-D (i.e., step 210 of FIG. 2).

Figure 4:
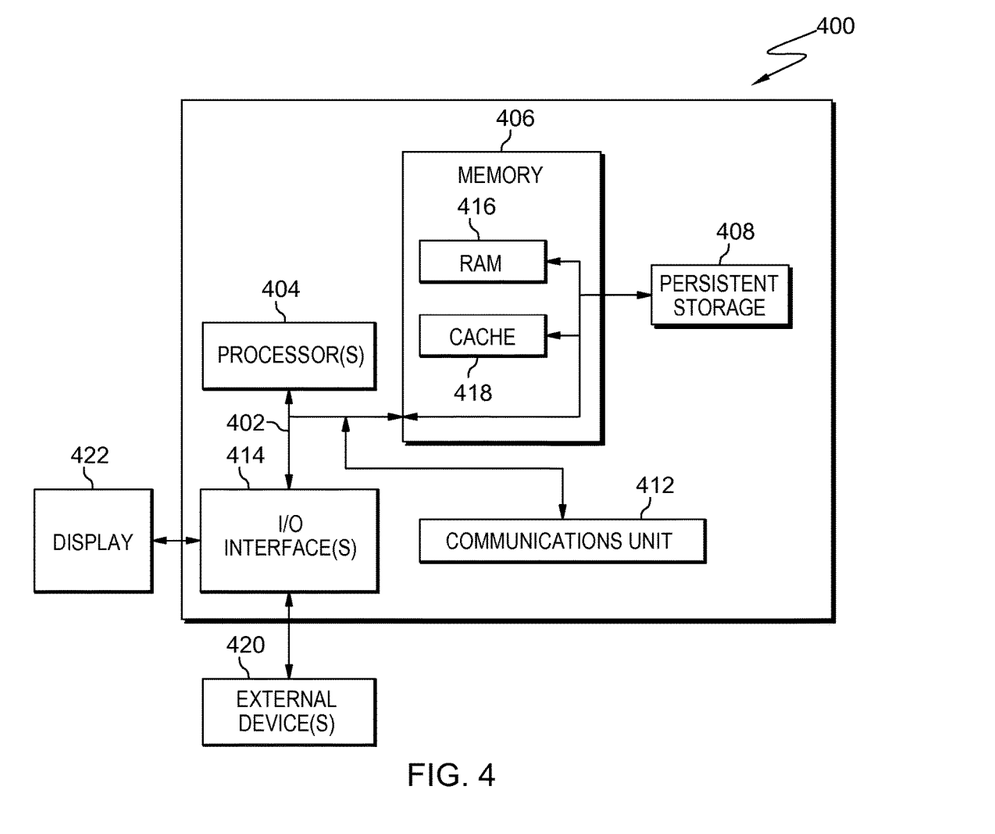
FIG. 4 depicts a block diagram of internal and external components of the computing devices of FIG. 1, in accordance with an illustrative embodiment of the present invention

FIG. 4 depicts a block diagram of components of a computing device, generally designated 400, in accordance with an illustrative embodiment of the present invention. In one embodiment, computing device 400 is representative of devices 110A-C and media content sources 104. It should be appreciated that FIG. 4 provides only an illustration of one implementation and does not imply any limitations with regard to the environments in which different embodiments may be implemented. Many modifications to the depicted environment may be made.

Computing device 400 include communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Program instructions and data used to practice embodiments of the present invention are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices, including resources of network 102. In these examples, communications unit 412 includes one or more network interface cards. Communications unit 412 may provide communications through the use of either or both physical and wireless communications links. Program instructions and data used to practice embodiments of the present invention may be downloaded to persistent storage 408 through communications unit 412.

I/O interface(s) 414 allows for input and output of data with other devices that may be connected to computing device 400. For example, I/O interface 414 may provide a connection to external device(s) 420 such as a keyboard, keypad, a touch screen, and/or some other suitable input device. External device(s) 420 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor or an incorporated display screen, such as is used in tablet computers and smart phones.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for suggesting media content, the method comprising:

receiving, by one or more processors, a request for media content from a first device associated with a first user;

identifying, by one or more processors, one or more other devices at a location associated with the first device by pairing the first device with each of the one or more other devices, wherein the location comprises a vehicle;

receiving, by one or more processors, a user identification of one or more other users associated with the one or more other devices;

assigning, by one or more processors, one or more weight values to the one or more users, wherein the first user is assigned a higher weight value than the one or more other users based on the received request originating from the first user;

receiving, by one or more processors, in response to the identification of the first device and the one or more other devices being present at the location, at least one media content preference from each of the first device and the one or more other devices, wherein the at least one media content preference received from each device has not previously been consumed by the user associated with each respective device;

identifying, by one or more processors, a list of media content preferences from among the at least one received media content preference associated with the first user and the one or more other users based on the assigned weight values, wherein the identified media content preferences have not been consumed by any of the first user and the one or more other users; and receiving, by one or more processors, one or more media content selections from among the identified list of media content preferences based on a determination that the one or more received media content selections corresponds to media which has not been previously consumed by any of the first user and the one or more users.

2. The method of claim 1, further comprising:

responsive to receiving the media content selection from among the identified list of media content preferences, causing the user selection to be played.

3. The method of claim 1, wherein the user selection based on the identified list of media content preferences is an aggregation of watch lists from a plurality of services available to the first user and the one or more other users.

4. The method of claim 1, wherein the at least one media content preference comprises at least one of: an audio content preference, a video content preference, and a text content preference.

5. The method of claim 1, wherein each of the first device and the one or more other devices are located at a same location.

6. The method of claim 1, further comprising:

at least one suggestion, based on more than one user, wherein the at least one suggestion comprises a preference of each of the more than one users.

7. The method of claim 1, further comprising: a request for media content, wherein the request for media content is based, at least in part, on a preference associated with each of the first user and the one or more other users.

8. A computer program product for suggesting media content comprising:

a non-transitory computer readable storage medium and program instructions stored on the computer readable storage medium, the program instructions comprising:

program instructions to receive, by one or more processors, a request for media content from a first device associated with a first user;

program instructions to identify one or more other devices at a location associated with the first device by pairing the first device with each of the one or more other devices, wherein the location comprises a vehicle;

program instructions to receive a user identification of one or more other users associated with the one or more other devices;

program instructions to assign one or more weight values to the one or more users, wherein the first user is assigned a higher weight value than the one or more other users based on the received request originating from the first user;

program instructions to receive at least one media content preference from each of the first device and the one or more other devices in response to the identification of the first device and the one or more other devices being present at the location, wherein the at least one media content preference has not previously been consumed by the user associated with each device;

program instructions to identify a list of media content preferences from among the at least one received media content preference associated with the first user and the one or more other users based on the assigned weight values, wherein the identified media content preferences have not been consumed by any of the first user and the one or more other users; and program instructions to receive one or more media content selections from among the identified list of media content preferences based on a determination that the one or more received media content selections corresponds to media which has not been previously consumed by any of the first user and the one or more users.

9. The computer program product of claim 8, further comprising:

program instructions to, responsive to receiving the media content selection from among the identified list of media content preferences, cause the user selection to be played.

10. The computer program product of claim 8, wherein the user selection based on the identified list of media content preferences is an aggregation of watch lists from a plurality of services available to the first user and the one or more other users.

11. The computer program product of claim 8, wherein the at least one media content preference comprises at least one of: an audio content preference, a video content preference, and a text content preference.

12. The computer program product of claim 8, wherein each of the first device and the one or more other devices are located at a same location.

13. The computer program product of claim 8, further comprising:

at least one suggestion, based on more than one user, wherein the at least one suggestion comprises a preference of each of the more than one users.

14. The computer program product of claim 8, further comprising: a request for media content, wherein the request for media content is based, at least in part, on a preference associated with each of the first user and the one or more other users.

15. A computer system for suggesting media content comprising:

one or more computer processors;

one or more non-transitory computer readable storage media;

program instructions stored on the one or more computer readable storage media for execution by at least one of the one or more processors, the program instructions comprising:

program instructions to receive, by one or more processors, a request for media content from a first device associated with a first user;

program instructions to identify one or more other devices at a location associated with the first device by pairing the first device with each of the one or more other devices, wherein the location comprises a vehicle;

program instructions to receive a user identification of one or more other users associated with the one or more other devices;

program instructions to assign one or more weight values to the one or more users, wherein the first user is assigned a higher weight value than the one or more other users based on the received request originating from the first user;

program instructions to receive at least one media content preference from each of the first device and the one or more other devices in response to the identification of the first device and the one or more other devices being present at the location, wherein the at least one media content preference has not previously been consumed by the user associated with each device;

program instructions to identify a list of media content preferences from among the at least one received media content preference associated with the first user and the one or more other users based on the assigned weight values, wherein the identified media content preferences have not been consumed by any of the first user and the one or more other users; and program instructions to receive one or more media content selections from among the identified list of media content preferences based on a determination that the one or more received media content selections corresponds to media which has not been previously consumed by any of the first user and the one or more users.

16. The computer system of claim 15, further comprising:
program instructions to, responsive to receiving the media content selection from among the identified list of media content preferences, cause the user selection to be played.

17. The computer system of claim 15, wherein the user selection based on the identified list of media content preferences is an aggregation of watch lists from a plurality of services available to the first user and the one or more other users.

18. The computer system of claim 15, wherein each of the first device and the one or more other devices are located at a same location.

19. The computer system of claim 15, further comprising:
at least one suggestion, based on more than one user, wherein the at least one suggestion comprises a preference of each of the more than one users.

20. The computer system of claim 15, further comprising:
a request for media content, wherein the request for media content is based, at least in part, on a preference associated with each of the first user and the one or more other users.

* * * * *